March 9, 1948. J. T. WARREN 2,437,628
DOG HARNESS
Filed March 29, 1945
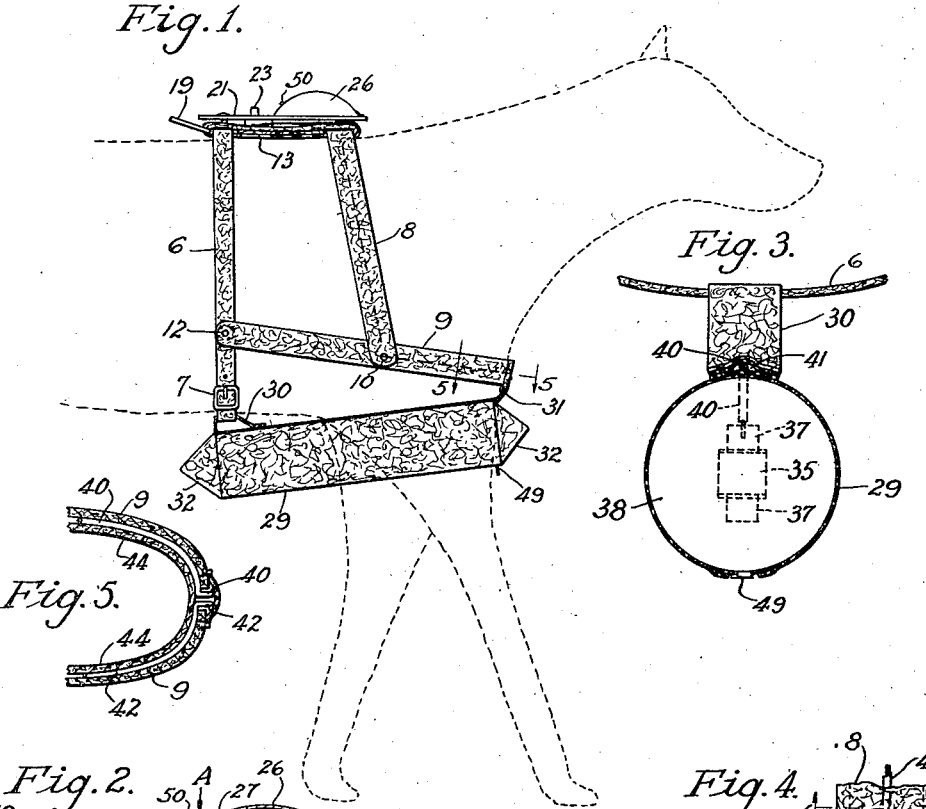
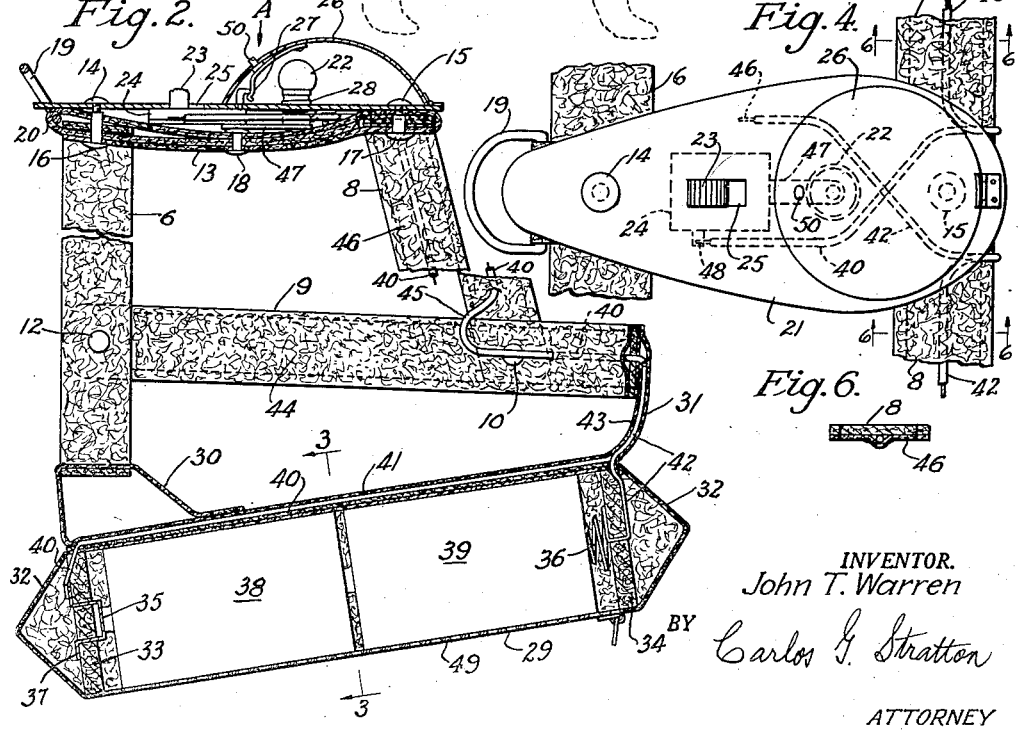
INVENTOR.
John T. Warren
BY Carlos G. Stratton
ATTORNEY Patented Mar. 9, 1948

2,437,628

UNITED STATES PATENT OFFICE 2,437,628

DOG HARNESS

John T. Warren, Long Beach, Calif.

Application March 29, 1945, Serial No. 585,462

3 Claims. (Cl. 240—59)

My invention relates to a dog harness and more particularly to an illuminated dog harness that aids in protecting a dog and an accompanying pedestrian, in traffic, at night.

Still another object is to provide means for illuminating a seeing eye dog in order to protect its blind master after dark.

A further object of such dog harness is to provide means for carrying a source of electricity, a light and a switch in a manner that will not interfere with the movements or travel of the dog.

My invention also has for its objects to provide such means that are convenient in use, easily installed in a working position and easily removed therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a dog harness, embodying the foregoing objects.

Fig. 2 is an enlarged, broken, longitudinal section of the harness.

Fig. 3 is a broken, transverse section, taken on the line 3—3 of Fig. 2.

Fig. 4 is a still further enlarged, broken plan view, looking in the direction of the arrow A of Fig. 2.

Fig. 5 is a broken section, taken on the line 5—5 of Fig. 1.

Fig. 6 is a transverse section, taken on either of the lines 6—6 of Fig. 4.

Referring more in detail to the drawings, the reference number 6 designates a girth band that extends around the body of the dog behind the fore quarters and generally around the dog's chest. A buckle 7 fastens the ends of the girth band 6 together. A strap 8 is arranged to extend across the top of the dog's shoulders and down at the sides thereof.

A breastband 9 extends at only a slight angle from the horizontal, preferably dipping down to a small degree at the front thereof. The breastband 9 is suitably fastened to the ends of the shoulder strap 8, such as by rivets 10, and suitably fastened to the girth band 6, such as by rivets 12.

A strap 13 is looped around the band 6 and strap 8 and the loops are held in place by screws 14 and 15 that are screwed into threaded socket members 16 and 17, respectively. A rivet 18 further holds the looped strap 13 in its arrangement. A ring 19 is also passed through the same loop 20 that embraces the band 6.

The screws 14 and 15 also hold a metal plate 21 upon the looped strap 13. This plate 21 carries a socket member 28 for an electric light bulb 22, while the thumb piece 23 of a suitable electric switch 24 projects through an opening 25 in the plate 21. A hinged, transparent cap 26 covers the electric light bulb 22. A releasable spring snap 27 fastens the cap in a closed position.

A battery case 29 is suspended from the band 6 by a loop 30 that passes around the band and by a strap 31 that supports the front end of the battery case 29 from the front portion of the breast-band 9. The battery case may be streamlined, as suggested at 32.

Fibrous discs 33 and 34 are arranged within the battery case substantially at the ends thereof. Contacts 35 and 36 project through apertures in the discs at opposite ends of the battery case. The contact 35 is shown in the form of a clip that projects through the disc 33 and has tabs 37 that are bent down on the outer face of the disc 33 away from the batteries 38 and 39. The contact 36 is in the form of a coiled spring in order to perform the dual function of resiliently contacting the battery 39 and holding the batteries together and holding the battery 38 in engagement with the contact 35.

The circuit for the light bulb 22 includes batteries 38 and 39, contact 35, a wire 40 soldered to one of the tabs 37 and passed down through a pocket 41 along the top of the battery case 29. A wire 42 is integral with the coil spring contact 36. The wires 40 and 42 are side by side between the strap 31 and its lining 43. Then the wires 40 and 42 fan out in opposite directions between the portions of the breastband 9, at opposite sides of the animal, and the lining 44 of the breastband, as perhaps best shown in Fig. 5.

A loop 45 in the wire 40 is shown in Fig. 2 that extends through the lining 44 and lies against the joining of the straps 8 and 9 and passes upward through a lining 46 and then between such lining and the shoulder strap 8. This is best illustrated in Fig. 6. It is believed clear without further illustration that this same construction obtains in the shoulder strap 8 at both sides of the animal.

The wire 42 is soldered to the conductive plate 21 at 46, so the circuit can be completed through the conductive socket member 28 to the light. The other contact at the tip of the light bulb engages a conductive strip 47 which leads to the switch 24. The wire 40 connects with the opposite pole of the switch, at 48, thus completing the circuit. It is believed clear without detailed illustration that a suitable zipper means 49 is employed along the bottom of the battery case 29 in order that the batteries may be replaced when worn out. Moreover, the battery case is water repellent, to protect the battery.

In the use of my present harness, it is thought clear that a dog's forelegs are placed through the harness with the battery case between the animal's forelegs. Then the breastband 6 is placed around its front, with the light and switch on top and the girth band fastened around the dog's body. Then a suitable leash may be attached to the loop 19.

Whenever the light is needed, of course, the switch is turned on. A replacement of the light bulb is easily made by merely releasing the spring catch 27 by pushing the finger piece 50, and lifting the cap. Moreover, by opening the zipper 49, replacements can be quickly made of the batteries. It is believed that the simplicity of the present device recommends it, as well as the practical nature of it that makes it suitable for different dogs, and since it does not interfere with the dog's movements or travel.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A dog harness comprising a girth portion, a back portion, a shoulder portion and a breast band, said breast band being connected near one end to said shoulder portion and at the rear thereof to said girth portion, screws securing both said shoulder and girth portions to said back portion, a plate removably secured to said back portion, a socket on said plate, a lamp in said socket, a translucent hood hinged to said plate and covering said lamp, a battery carrier suspended from the bottom of said girth portion and the end of said breast portion, said lamp being in a circuit which includes the battery, and switch.

2. A dog harness comprising a plurality of body, shoulder and breast straps, a back strap connected to said body and shoulder straps, a plate on said back strap, means removably to secure said plate to said shoulder and body straps, a source of illumination on said plate, an electrical circuit including said source and a battery, a carrier for said battery suspended at the rear from said body strap and at the front from said breast strap, a switch on said plate, and a translucent hood hinged to said plate and covering said source of illumination.

3. A dog harness comprising a girth strap, a shoulder strap and a breast band connected near the front thereof to said shoulder strap and at the rear thereof to said girth strap, a back strap connecting said shoulder and girth straps, a plate, screws to hold said plate removably connected to said back strap, a socket on said plate, a lamp in said socket, a translucent hood covering said lamp, an electrical circuit, including said lamp and a battery, a switch on said plate to control the current to said socket, and a carrier for said battery, said carrier being suspended at the rear thereof from said girth strap, and at the front thereof from the front of said breast strap.

JOHN T. WARREN.

REFERENCES CITED

The following references are of record in the file of this patent:

UNITED STATES PATENTS

| Number | Name | Date |
| --- | --- | --- |
| 904,031 | Warner | Nov. 17, 1908 |
| 1,620,842 | Van Rensselaer | Mar. 15, 1927 |
| 2,026,383 | Gyulay | Dec. 31, 1935 |

FOREIGN PATENTS

| Number | Country | Date |
| --- | --- | --- |
| 490,219 | Germany | Jan. 24, 1930 |
| 679,311 | Germany | Aug. 2, 1939 |